United States Patent
Yamazaki

(10) Patent No.: US 8,661,140 B2
(45) Date of Patent: Feb. 25, 2014

(54) INTERFACE APPARATUS, EXCHANGE APPARATUS WITH THE APPARATUS, AND CONTROL METHOD FOR USE IN THE APPARATUS

(75) Inventor: Atsushi Yamazaki, Hachioji (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 540 days.

(21) Appl. No.: 12/171,190

(22) Filed: Jul. 10, 2008

(65) Prior Publication Data

US 2009/0037589 A1 Feb. 5, 2009

(30) Foreign Application Priority Data

Jul. 31, 2007 (JP) ................................. 2007-199457

(51) Int. Cl.
*G06F 15/16* (2006.01)
*H04L 29/06* (2006.01)
*H04L 29/12* (2006.01)

(52) U.S. Cl.
CPC .... *H04L 29/06292* (2013.01); *H04L 29/12594* (2013.01)
USPC ........... 709/227; 370/392; 370/400; 370/351; 709/228; 709/229

(58) Field of Classification Search
CPC .................... H04L 29/06292; H04L 29/12594
USPC ....................................................... 709/227
See application file for complete search history.

(56) References Cited

U.S. PATENT DOCUMENTS

| 6,678,735 B1* | 1/2004 | Orton et al. ................... 709/230 |
| 7,301,952 B2* | 11/2007 | Furukawa et al. ............. 370/400 |
| 7,330,470 B2* | 2/2008 | Nakazawa et al. ............ 370/392 |
| 2005/0107123 A1* | 5/2005 | Ishii et al. ..................... 455/560 |
| 2007/0064896 A1* | 3/2007 | Chang et al. .................. 379/156 |
| 2007/0286163 A1* | 12/2007 | Oka et al. ...................... 370/352 |
| 2008/0059640 A1* | 3/2008 | Oka et al. ...................... 709/228 |
| 2008/0267096 A1* | 10/2008 | Nakamura et al. ............ 370/261 |

FOREIGN PATENT DOCUMENTS

| JP | 2004-363790 | 12/2004 |
| JP | 2005-236670 | 9/2005 |
| JP | 2006-42176 | 2/2006 |
| JP | 2006-180104 | 7/2006 |

* cited by examiner

*Primary Examiner* — Krista Zele
*Assistant Examiner* — Arvin Eskandarnia
(74) *Attorney, Agent, or Firm* — Blakely, Sokoloff, Taylor & Zafman LLP

(57) ABSTRACT

According to one embodiment, an interface apparatus includes a connector which establishes connection with a plurality of Session Initiation Protocol (SIP) terminals which each include communication functions defined by SIP and with an SIP network to one port, a first processor which executes exchange processing for the plurality of SIP terminals, a second processor which executes exchange processing for the SIP network, and a sorting unit which sorts a control signal into the first processor or the second processor based on transmission destination identification information or transmission origin identification information in the control signal regarding exchange received by the connector.

3 Claims, 3 Drawing Sheets

INTERFACE APPARATUS, EXCHANGE APPARATUS WITH THE APPARATUS, AND CONTROL METHOD FOR USE IN THE APPARATUS

CROSS-REFERENCE TO RELATED APPLICATIONS

This application is based upon and claims the benefit of priority from Japanese Patent Application No. 2007-199457, filed Jul. 31, 2007, the entire contents of which are incorporated herein by reference.

BACKGROUND

1. Field

One embodiment of the present invention relates to a Session Initiation Protocol (SIP) trunk gateway apparatus. More specifically, the present invention relates to an interface configured to establish connection with both an SIP terminal and an SIP network, an exchange apparatus with the interface apparatus and a control method for use in the interface apparatus.

2. Description of the Related Art

In recent years, an internet Protocol (IP) telephone system which interactively transmits and receives in real time images and voice as packet data via an IP network has become widely used. The IP telephone system may perform extension communication and outside-line origination and termination among main apparatuses as well as may perform inter-extension communication and outside-line origination and termination for each main apparatus to be connected to the IP network. The IP telephone system has widely used SIP as its protocol.

This kind of system registers an SIPURI (terminal ID) of an SIP terminal for each main apparatus in a registration server of an enterprise on an SIP network in advance. In making a telephone call, the registration server authenticates the SIP terminal based on the registered SIPURI (e.g., Jpn. Pat. Appln. KOKAI Publication No. 2006-42176).

Meanwhile, the main apparatus separates IP ports to receive SIP messages at the SIP terminals and the SIP network. In this case, since the SIP terminal (hereinafter referred to as an SIP server function) uses a port number 5060, the IP network (hereinafter referred to as an SIP client function) uses a port number 5062 and they may not use a well-known default port number 5060, setting the SIP terminals and network devices such as a fire wall and an application layer gateway becomes complicated and inconvenient.

BRIEF DESCRIPTION OF THE SEVERAL VIEWS OF THE DRAWINGS

A general architecture that implements the various feature of the invention will now be described with reference to the drawings. The drawings and the associated descriptions are provided to illustrate embodiments of the invention and not to limit the scope of the invention.

DETAILED DESCRIPTION

Various embodiments according to the invention will be described hereinafter with reference to the accompanying drawings. In general, according to one embodiment of the invention, an interface apparatus, comprising a connector which establishes connection with a plurality of Session initiation Protocol (SIP) terminals which each include communication functions defined by SIP and with an SIP network to one port; a first processor which executes exchange processing for the plurality of SIP terminals; a second processor which executes exchange processing for the SIP network; and a sorting unit which sorts a control signal into the first processor or the second processor based on transmission destination identification information or transmission origin identification information in the control signal regarding exchange received by the connector.

Figure 1:
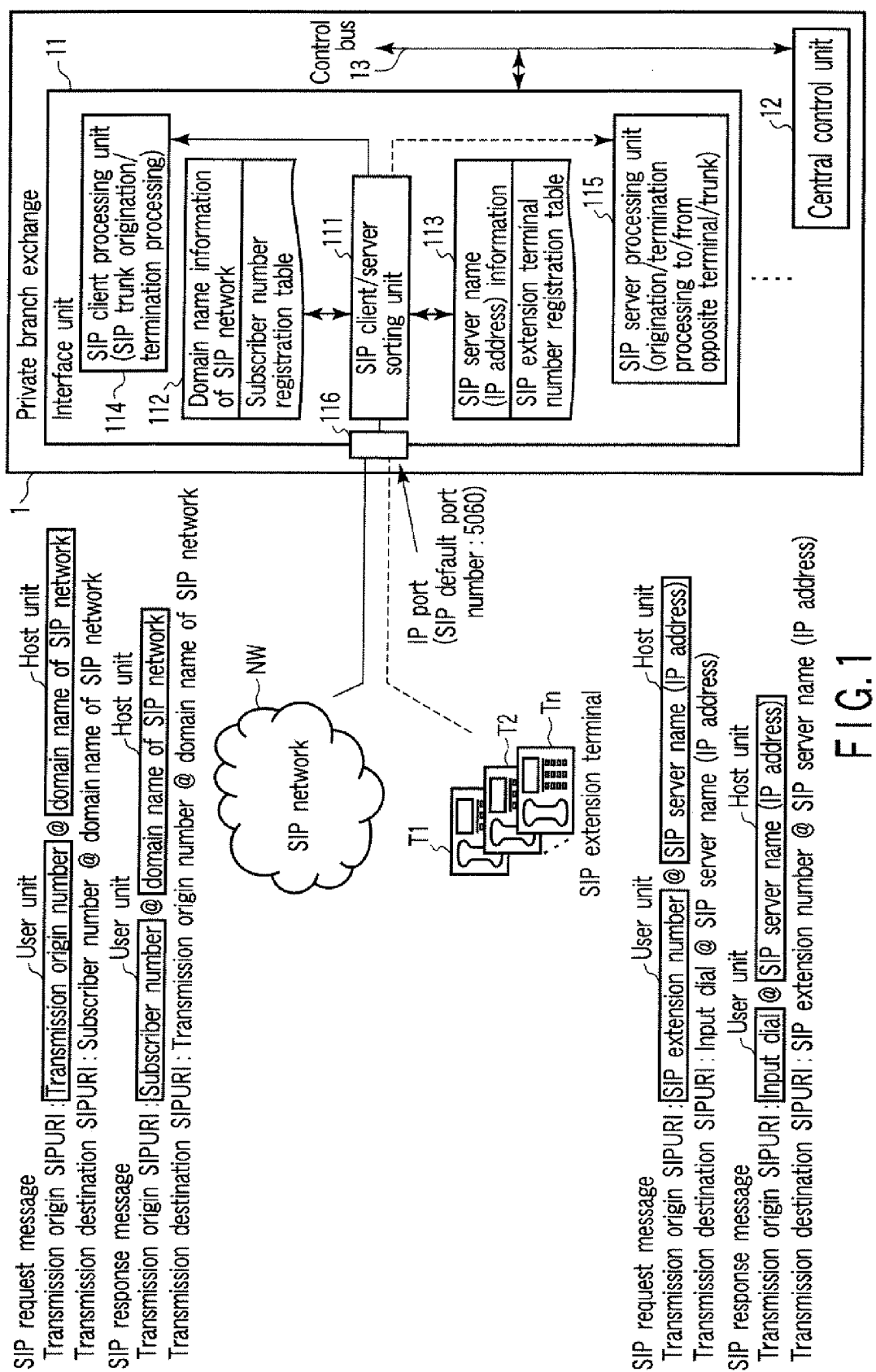
FIG. 1 is a block diagram depicting an embodiment of an IP telephone system regarding the invention.

FIG. 1 shows a block diagram depicting an embodiment of an IP telephone system regarding the invention, and a numerical FIG. 1 designates a private branch exchange apparatus.

The private branch exchange apparatus 1 includes a plurality of interface units (here, to make description simpler only interface unit 11 is shown) and a central control unit 12, and they are mutually connected through a control bus 13.

The interface unit 11 is connected to an SIP network NW, and conducts establishment processing of a call to and from the SIP network NW under the control by the central control unit 12. The interface unit 11 houses a plurality of SIP extension terminals T1-Tn (n is natural number). The interface unit 11 then conducts interface operations such as origination and termination processing to and from the plurality of SIP extension terminals T1-Tn. The interface unit 11 transmits and receives a variety of items of control information regarding the interface operations to and from the plurality of SIP extension terminals T1-Tn to and from the central control unit 12.

Meanwhile, the central control unit 12 has a control function to achieve operations as the private branch exchange apparatus 1.

Now, the interface unit 11 of the embodiment consists of an SIP client/server sorting unit 111 (hereinafter, sorting unit 111); a subscriber number registration table with domain name information of the SIP network NW stored therein (hereinafter, table 112); and an SIP extension terminal number registration table 113 (hereinafter, table 113) with SIP server name (IP address) information stored therein; an SIP client processing unit 114; an SIP server processing unit 115; and an only one IP port 116 for SIP message reception.

The sorting unit 111 utilizes a transmission origin SIPURI or a transmission destination SIPURI included in an SIP request message or an SIP response message to be received by the IP port 116, refers to the tables 112, 113, and executes sorting control of the SIP request message or the SIP response message to the SIP client processing unit 114 or the SIP server processing unit 115 based on the reference result.

Figure 2:
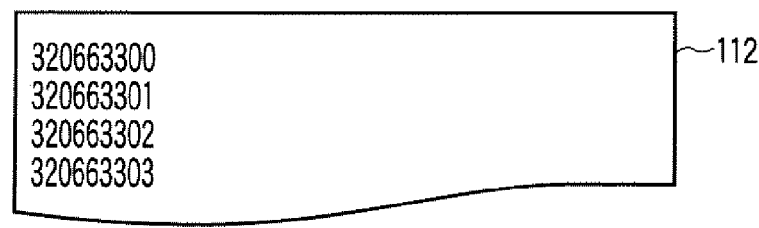
FIG. 2 is a view depicting an example of storage content in a subscriber number registration table depicted in FIG. 1.

All items of information on subscriber numbers (corresponding to user units of SIPURI) assigned from a service provider on the SIP network NW is registered in the table 112 in advance as shown in FIG. 2.

Figure 3:
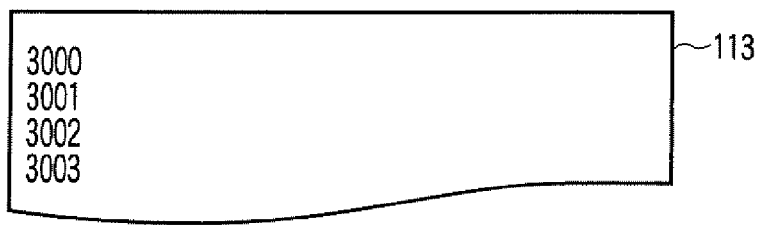
FIG. 3 is a view depicting an example of storage content of an SIP extension terminal number registration table depicted in FIG. 1.

All items of information on members (corresponding to user units of SIPURI) of the SIP extension terminals T1-Tn to be housed in the private branch exchange apparatus 1 is registered in the table 113 in advance as shown in FIG. 3.

The SIP client processing unit 114 transmits and receives control information regarding the interface operations to and from the central control unit 12 as well as executes establishment processing of a call to and from the SIP network NW.

The SIP server processing unit 115 transmits and receives control information regarding the interface operations as well as performs interface operations such as origination and termination processing to and from the plurality of SIP extension terminals T1-Tn.

Figure 4:
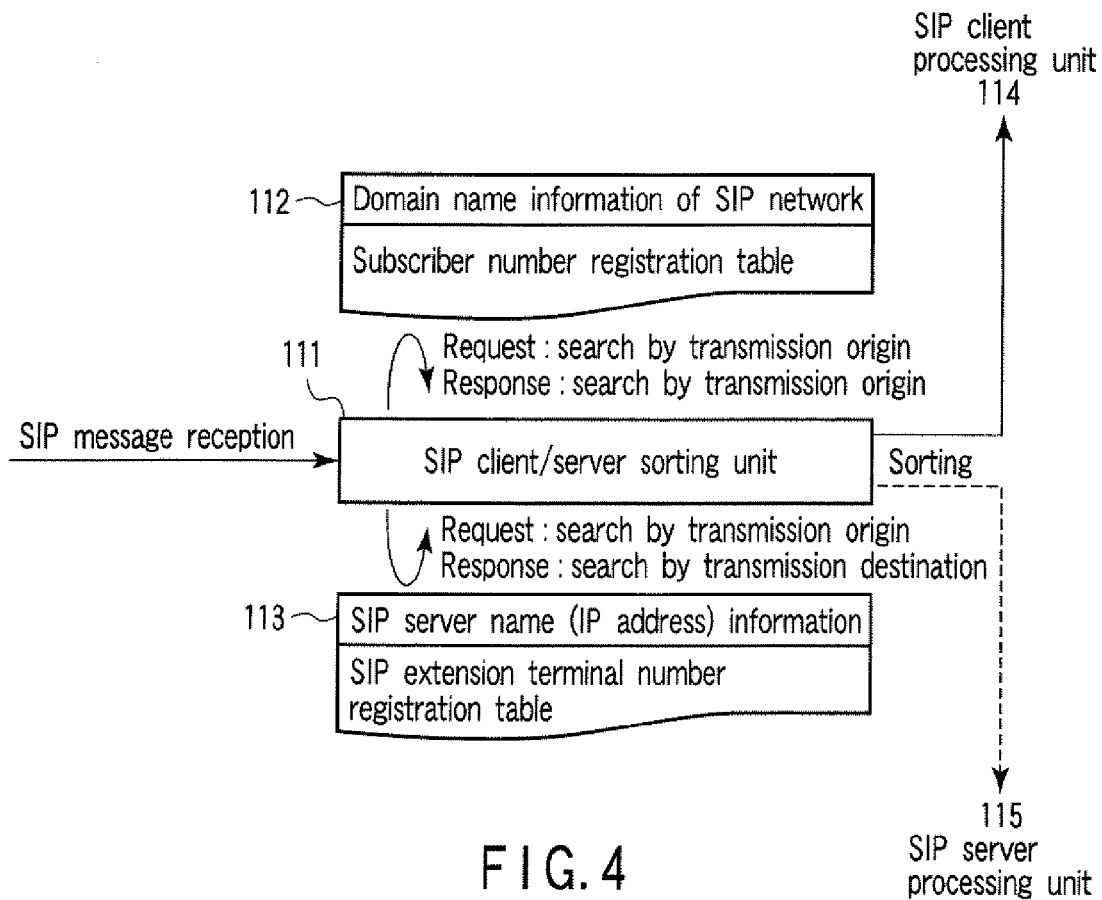
FIG. 4 is a sequence view depicting for explaining processing operations at an SIP client/server sorting unit of the embodiment.

FIG. 4 shows a sequence view depicting for explaining processing operations of the sorting unit 111.

When the sorting unit 111 receives an SIP message, if the received SIP message is a request message, the sorting unit 111 searches in the table 112 by using the user unit of the transmission destination SIPURI of the SIP request message as a key, and if there is any subscriber number being consistent with a subscriber number in the received SIP request message, the sorting unit 111 compares a host unit of the transmission destination SIPURI of the SIP request message with domain name information of the SIP network NW. If the host unit coincides with the domain name information, the sort unit 111 sorts the received SIP request message to the SIP client processing unit 114.

Conversely, if the received SIP request message has not been sorted to the SIP client processing unit 114, the sorting unit 111 searches the table 113 by using the user unit of a transmission origin SIPURI of the SIP request message as a key, and if there is any extension terminal number being consistent with the extension number in the received SIP request message, compares a host unit of the transmission origin SIPURI with SIP server name (IP address) information. If the host unit coincides with the SIP server name information, the sort unit 111 sorts the received SIP request message to the SIP server processing unit 115.

If the received SIP message is a response, the sorting unit 111 searches the table 112 by using the user unit of the transmission origin SIPURI of the SIP response message as a key. If there is any subscriber number being consistent with the subscriber number in the received SIP response message, the sorting unit 111 compares the host unit of the transmission origin SIPURI of the SIP response message with the domain name information of the SIP network NW, and if they coincide with each other, sorts the received SIP response message to the SIP client processing unit 114.

Conversely, if the received SIP message has not been sorted to the SIP client processing unit 114, the sorting unit 111 searches the table 113 by using the user unit of the transmission destination SIPURI of the SIP response message as a key, if there is any SIP extension terminal number being consistent with the extension number in the received SIP message, the sorting unit 111 compares the host unit of the transmission destination SIPURI of the SIP response message with the SIP server name (IP address) information, and if they coincide with each other, sorts the received SIP message to the SIP server processing unit 115.

Figure 5:
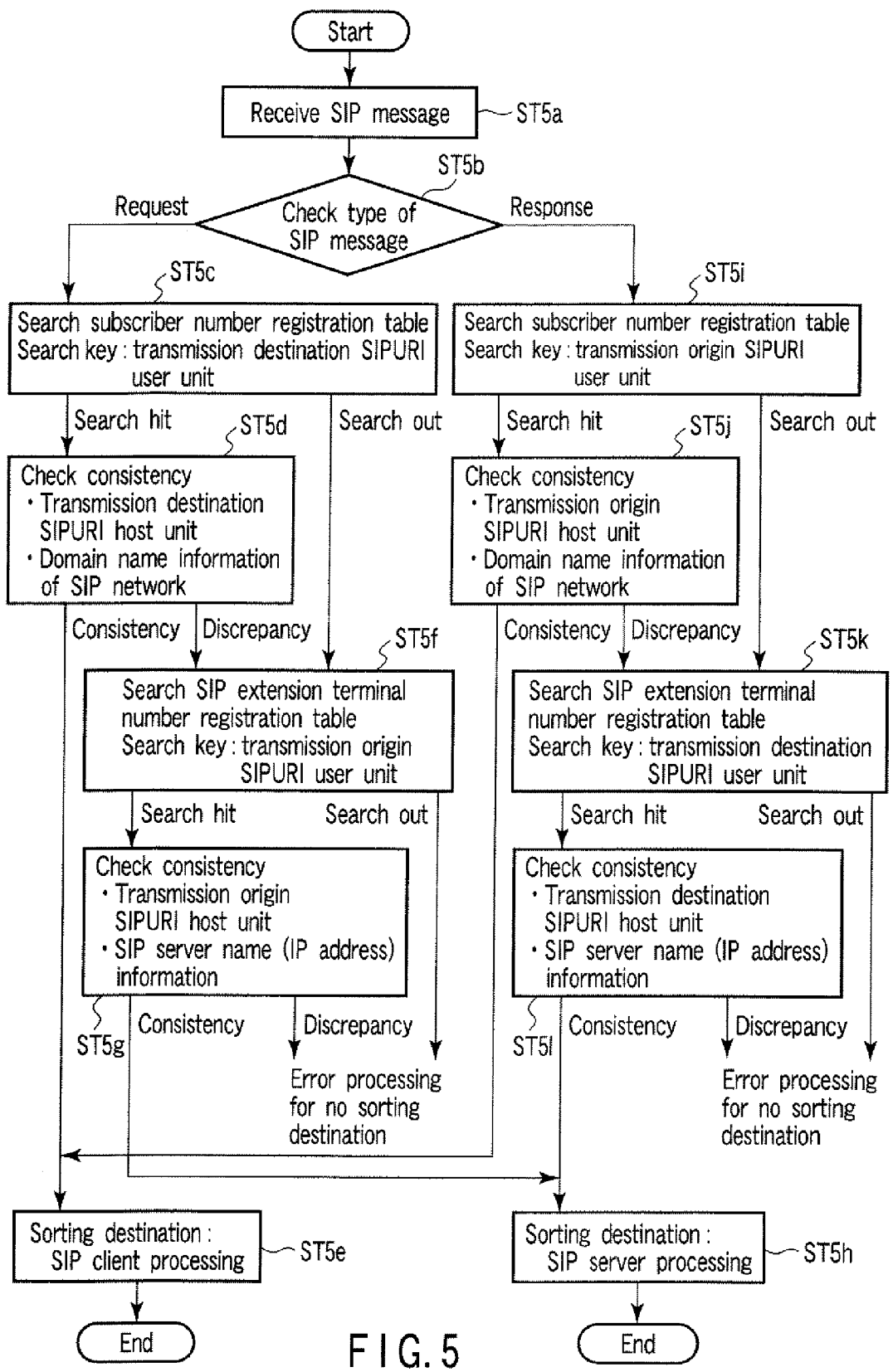
FIG. 5 is a flowchart depicting a control processing procedure of SIP client/server sorting at the SIP client/server sorting unit of the embodiment.

FIG. 5 shows a flowchart depicting an SIP client/server sorting control processing procedure of the sorting unit 111.

When receiving the SIP message, the sorting unit 111 shifts from processing in block ST5*a* to processing in block ST5*b*, and determines an SIP message type there. In a case that the SIP message type is a request, the sorting unit 111 searches the table 112 by utilizing the user unit of the transmission destination SIPURI in the SIP request message as a search key. If there is a subscriber number being coincident with that in the received SIP message, the sorting unit 111 shifts from block ST5*c* to block ST5*d*, and compares the host unit of the transmission destination SIPURI with the domain name information of the SIP network NW, and it they coincide with each other, the sorting destination of the received SIP message is set to the SIP client processing unit 114 (block ST5*e*).

Conversely, searching out in the table 112 in block ST5*c*, or comparing the host unit of the transmission destination SIPURI with the information on the domain name of the SIP network results in discrepancy, the sorting unit 111 searches the table 113 by using the user unit of the transmission origin SIPURI in the SIP request message as a search key (block ST5*f*). If there is any SIP extension terminal number, the sorting unit 111 compares the host unit of the transmission origin SIPURI with the SIP server name (IP address) information (block ST5*g*), and if they coincide with each other, the sorting unit 111 transmits the received SIP message to the SIP server processing unit 115 (block ST5*h*).

If the searching out in the table 113 in block ST5*f* or comparison between the host unit of the transmission origin SIPURI and the SIP server name (IP address) information in block ST5*g* result in discrepancy, the sorting unit 111 determines that there is no sorting destination and performs error processing such as transmission of an SIP error response.

In block ST5*b*, if an SIP message type is a response, the sorting unit 111 searches the table 112 by using the user unit of the transmission origin SIPURI in the SIP response message as a search key (block ST5*i*). If there is any subscriber number being consistent with that in the received SIP message in block ST5*b*, the sorting unit 111 compares the host unit of the transmission origin SIPURI with the domain name information of the SIP network NW (block ST5*j*), and the sorting destination in a case where the comparison results in consistency is set to the SIP client processing unit 114.

Conversely, if the searching out in the stable 112 in block ST5*i*, or comparison between the host unit of the transmission origin SIPURI and the domain name information of the SIP network NW in block ST5*j* results in discrepancy, the sorting unit 111 searches the table 113 by using the user unit of the transmission destination SIPURI in the SIP response message as a search key (block ST5*k*). If there is any SIP extension terminal number being consistent with that in the received SIP response message, the sorting unit 111 compares the host unit of the transmission destination SIPURI with the SIP server name (IP address) information (block ST5*l*), and if they coincide with each other, the sorting destination is set to the SIP server processing unit 115.

If searching out of the table 113 in block ST5*k*, or comparison between the host unit of the transmission destination SIPURI and the SIP server name (IP address) information in block ST5*l* results in discrepancy, the sorting unit 111 determines that there is no sorting destination and performs error processing such as discard of the SIP response message.

As mentioned above, according to the embodiment, the interface unit 11 connects the plurality of SIP extension terminals T1-Tn and the SIP network NW to one IP port 116, and has the SIP client processing unit 114 and the SIP server processing unit 115 built-in. When receiving the SIP message through one IP port 116, the sorting unit 111 utilizes the transmission destination SIPURI in the SIP message or transmission origin SIPURI to sort the SIP message to the SIP client processing unit 114 and the SIP server processing unit 115.

Therefore, it becomes able to easily construct a network environment by using only the default port number 5060 of the well-known SIP by configuring so as to receive the SIP message of a different SIP service such as an SIP server function and an SIP client function.

According to the foregoing embodiment, the interface unit 11 utilizes the information on the SIP extension terminals T1-Tn and the SIP network NW registered in the tables 112, 113 and may sort the SIP messages to the SIP client processing unit 114 and the SIP server processing unit 115 with a simple procedure.

While the embodiment given above has described the example which searches first of other tables when the SIP message is received by the IP port 116, searching the table 113 firstly is a possible approach.

A terminal using a wireless LAN or a software-phone on a personal commuter as long as it is equipped with a communication function defined by SIP can be used as the SIP extension terminal.

While the aforementioned embodiment has described the example in which the private branch exchange apparatus 1 is provided with the interface unit 11, other electronic devices each provided with the interface unit 11 can be used.

Other than this, a configuration and a type of a system, a configuration and a type of a private branch exchange, a function of an interface unit, stored content of a subscriber number registration table and an SIP extension terminal number registration table, a control method of sorting SIP messages to an SIP client processing unit and to a SIP server processing unit, etc., can be embodied in various forms without departing from the spirit or scope of the inventive concept of the invention.

While certain embodiments of the inventions have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. An interface apparatus, comprising:
   a connector which establishes connection with a plurality of Session Initiation Protocol (SIP) terminals which each include communication functions defined by SIP and with an SIP network to one port;
   a memory which stores (i) subscriber IDs assigned from a service provider on the SIP network and (ii) terminal ID specifying the plurality of SIP terminals, wherein the subscriber IDs correspond with URIs;
   a client processor which executes exchange processing for the plurality of SIP terminals;
   a server processor which executes exchange processing for the SIP network, wherein the exchange processing for the SIP network is different from the exchange processing of the client processor; and
   a sorting unit which determines that a control signal type regarding exchange received by the connector is a request or a response,
   wherein when the control signal type is the request, the sorting unit compares transmission destination URI in the control signal with the subscriber ID in the memory, and the sorting unit sorts the control signal into the client processor if the transmission destination URI of the control signal is registered in the subscriber ID,
   wherein when the control signal type is the response, the sorting unit compares transmission origin URI in the control signal with the subscriber ID in the memory, and sorts the control signal into the server processor if the transmission origin URI of the control signal is registered in the subscriber ID,
   wherein when the control signal type is the request, if the transmission destination URI of the control signal is not registered in the subscriber ID, the sorting unit compares the transmission destination URI in the control signal with the terminal ID in the memory, and if the transmission destination URI of the control signal is registered in the terminal ID, the sorting unit sorts the control signal into the server processor,
   wherein when the control signal type is the response, if the transmission origin URI of the control signal is not registered in the subscriber ID, the sorting unit compares the transmission origin URI in the control signal with the terminal ID in the memory, and if the transmission destination URI of the control signal is registered in the terminal ID, the sorting unit sorts the control signal into the client processor.

2. An exchange apparatus, comprising:
   an interface apparatus configured to house a plurality of Session Initiation Protocol (SIP) terminals which each include communication functions defined by SIP and establish connection with an SIP network; and
   an exchange controller which makes the interface apparatus execute exchange processing regarding the plurality of SIP terminals or the SIP network, wherein
   the interface apparatus includes:
      a connector which connects the plurality of SIP terminals and the SIP network by one port;
      a memory which stores (i) subscriber IDs assigned from a service provider on the SIP network and (ii) terminal IP specifying the plurality of SIP terminals, wherein the subscriber IDs correspond with URIs;
      a client processor which executes exchange processing for the plurality of SIP terminals;
      a server processor which executes exchange processing for the SIP network, wherein the exchange processing for the SIP network is different from the exchange processing of the client processor; and
      a sorting unit which determines that a control signal type regarding exchange received by the connector is a request or a response,
   wherein when the control signal type is the request, the sorting unit compares transmission destination URI in the control signal with the subscriber ID in the memory, and the sorting unit sorts the control signal into the client processor if the transmission destination URI of the control signal is registered in the subscriber ID,
   wherein when the control signal type is the response, the sorting unit compares transmission origin URI in the control signal with the subscriber ID in the memory, and sorts the control signal into the server processor if the transmission origin URI of the control signal is registered in the subscriber ID,
   wherein when the control signal type is the request, if the transmission destination URI of the control signal is not registered in the subscriber ID, the sorting unit compares transmission destination URI in the control signal with the terminal ID in the memory, and if the transmission destination URI of the control signal is registered in the terminal ID, the sorting unit sorts the control signal into the server processor,
   wherein when the control signal type is the response, if the transmission origin URI of the control signal is not registered in the subscriber ID, the sorting unit compares the transmission origin URI in the control signal with the terminal ID in the memory, and if the transmission destination URI of the control signal is registered in the terminal ID, the sorting unit sorts the control signal into the client processor.

3. A control method for use in an interface apparatus configured to establish connection with a plurality of Session Initiation Protocol (SIP) terminals which each include communication functions defined by SIP and with an SIP network to one port, and configured to include a client processor which executes exchange processing for the plurality of SIP terminals, and a server processor which executes exchange processing for the SIP network that is different from the exchange processing of the client processor, comprising:

storing subscriber IDs assigned from a service provider on the SIP network in a memory and storing terminal ID specifying the plurality of SIP terminals in the memory, wherein the subscriber IDs correspond with URIs;

determining that a control signal type regarding exchange received by the connector is a request or a response, wherein when the control signal type is the request, comparing a transmission destination URI in the control signal with the subscriber ID in the memory, and sorting the control signal into the client processor if the transmission destination URI of the control signal is registered in the subscriber ID, wherein when the control signal type is the response, comparing the transmission origin URI in the control signal with the subscriber ID in the memory, and sorting the control signal into the server processor if the transmission origin URI of the control signal is registered in the subscriber ID, wherein when the control signal type is the request, if the transmission destination URI of the control signal is not registered in the subscriber ID, the sorting comprises comparing the transmission destination URI in the control signal with the terminal ID in the memory, and if the transmission destination URI of the control signal is registered in the terminal ID, sorting the control signal into the server processor, wherein when the control signal type is the response, if the transmission origin URI of the control signal is not registered in the subscriber ID, the sorting comprises comparing the transmission origin URI in the control signal with the terminal ID in the memory, and if the transmission destination URI of the control signal is registered in the terminal ID, sorting the control signal into the client processor.

\* \* \* \* \*